US 8,041,368 B2

(12) United States Patent
Shoki et al.

(10) Patent No.: US 8,041,368 B2
(45) Date of Patent: *Oct. 18, 2011

(54) MOBILE COMMUNICATIONS TERMINAL, SERVICE AREA CALCULATION APPARATUS AND METHOD OF CALCULATING SERVICE AREA

(75) Inventors: Hiroki Shoki, Kawasaki (JP); Ichiro Seto, Fuchu (JP); Shuichi Sekine, Yokohama (JP); Kuniaki Ito, Kawasaki (JP); Naoko Ono, Tokyo (JP); Hiroshi Yoshida, Yokohama (JP); Takehiko Toyoda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1016 days.

This patent is subject to a terminal disclaimer.

(21) Appl. No.: 11/935,260

(22) Filed: Nov. 5, 2007

(65) Prior Publication Data

US 2008/0305807 A1    Dec. 11, 2008

Related U.S. Application Data

(60) Continuation of application No. 11/411,854, filed on Apr. 27, 2006, now Pat. No. 7,292,866, which is a division of application No. 10/737,762, filed on Dec. 18, 2003, now Pat. No. 7,120,417.

(30) Foreign Application Priority Data

Dec. 18, 2002    (JP) .................. 2002-366906

(51) Int. Cl.
H04Q 7/20    (2006.01)
(52) U.S. Cl. .................. 455/456.1; 370/310.2
(58) Field of Classification Search .............. 370/310.2, 370/328, 338, 349; 455/403, 404.4, 456.1, 455/456.6, 404.2
See application file for complete search history.

(56) References Cited

U.S. PATENT DOCUMENTS

| 5,999,126 | A | 12/1999 | Ito |
| 6,363,255 | B1 | 3/2002 | Kuwahara |
| 7,120,417 | B2 * | 10/2006 | Shoki et al. ............ 455/403 |
| 7,292,866 | B2 * | 11/2007 | Shoki et al. ............ 455/456.1 |
| 2002/0142768 | A1 | 10/2002 | Murata et al. |
| 2003/0129994 | A1 | 7/2003 | Nagatsuma et al. |
| 2004/0147226 | A1 | 7/2004 | Matsuo et al. |

FOREIGN PATENT DOCUMENTS

| JP | 10/257545 | 9/1998 |
| JP | 2001-61178 | 3/2001 |
| JP | 2001-136121 | 5/2001 |
| JP | 2001-197538 | 7/2001 |
| JP | 2002-159041 | 5/2002 |
| JP | 2002-171214 | 6/2002 |
| JP | 2002-223218 | 8/2002 |
| JP | 2002-236632 | 8/2002 |
| JP | 2004-511988 | 4/2004 |
| JP | 2005-531982 | 10/2005 |
| WO | WO 2004/004376 | 1/2004 |

* cited by examiner

*Primary Examiner* — Brenda H Pham
(74) *Attorney, Agent, or Firm* — Oblon, Spivak, McClelland, Maier & Neustadt, L.L.P.

(57) ABSTRACT

A mobile communications terminal includes positional information generator configured to generate positional information indicating a current position of the terminal, receiver which receives identification information sent from the base station of the second mobile communication network, notification information generator configured to generate notification information including the identification information and the positional information generated at the time of receiving the identification information, and transmitter which transmits the notification information to the service area calculation apparatus via the first mobile communication network to derive the information concerning the service area.

8 Claims, 6 Drawing Sheets

| Base station identification information | Position (latitude, longitude) | Date and time of detection |
|---|---|---|
| 11223344 | East longitude 139.413649 North latitude 35.324579<br>East longitude 139.453945 North latitude 35.385433<br>East longitude 139.452186 North latitude 35.404529 | 2002/12/25/12:00<br>2002/12/25/10:53<br>2002/12/20/15:06 |
| 22335566 | ----- | ----- |
| 77889900 | ----- | ----- |
| | ----- | ----- |

MOBILE COMMUNICATIONS TERMINAL, SERVICE AREA CALCULATION APPARATUS AND METHOD OF CALCULATING SERVICE AREA

CROSS-REFERENCE TO RELATED APPLICATIONS

This application is a Continuation of U.S. patent application Ser. No. 11/411,854, filed Apr. 27, 2006, which is a Divisional of U.S. patent application Ser. No. 10/737,762, filed Dec. 18, 2003, and is based upon and claims the benefit of priority from the prior Japanese Patent Application No. 2002-366906, filed Dec. 18, 2002. The entire contents of these applications are incorporated herein by reference.

BACKGROUND OF THE INVENTION

1. Field of the Invention

The present invention relates to a mobile communications terminal, a service area calculation apparatus which calculates a service area of a mobile communications network, and a method of calculating the service area.

2. Description of the Related Art

As wireless LANs (local area network) have recently become common, various providers provide mobile communications services in various spots.

Such mobile communications services generally use a wireless communication method. Therefore, if a user makes a contract with service providers, he/she can be provided with various services anytime and anywhere with one mobile communications terminal.

However, service areas of the mobile communications services mentioned above are discretely formed. It is thus difficult for the user to know where the service areas are located.

In addition, in a method disclosed in the patent document (Jpn. Pat. Appln. KOKAI Publication No. 2002-223218), an address (MAC address) unique to a wireless terminal, positional information thereof and a communication quality concerned with the position are stored so as to form a plane view that tells whether or not the communication quality is good in a plane where the wireless terminal can be disposed.

Under the circumstances described above, it is desired that the various service areas should be generally grasp.

In the Patent document described above, it is found out whether or not the communication quality is good in a plane where the wireless terminal can be located, for example, based on a communication state in the wireless terminal. It can not be applied to grasp of the respective service areas that belong to a plurality of mobile communications networks.

In other words, the Patent document described above, does not allow the service area of the mobile communications network to be grasp by a third party except for its operator. Therefore, it is difficult to grasp conditions of a plurality of service areas formed by various operators at their discretion.

BRIEF SUMMARY OF THE INVENTION

The present invention has been attained in consideration of such circumstances, and its object is to allow a service area of a mobile communications network to be grasp even by those who are not its operators.

According to an aspect of the present invention, there is provided a mobile communications terminal adapted to communicate with a service area calculation apparatus via a first mobile communication network, the service area calculation apparatus collecting and transmitting information concerning a service area provided by the first mobile communication network and a second mobile communication network including a base station, the mobile communications terminal comprising: a positional information generator configured to generate positional information indicating a current position of the terminal; a receiver which receives identification information sent from the base station of the second mobile communication network; a notification information generator configured to generate notification information including the identification information and the positional information generated at the time of receiving the identification information; and a transmitter which transmits the notification information to the service area calculation apparatus via the first mobile communication network to derive the information concerning the service area.

According to another aspect of the present invention, there is provided a service area calculation apparatus comprising: a receiver which receives the notification information transmitted from the mobile communications terminal according to claim 1 via the first mobile communication network; a storage device which stores a table indicating the positional information and the identification information associated with each other; and a calculation device configured to calculate a service area of the base station indicated by the identification information based on a distribution of a position indicated by the positional information in correspondence with the identification information referring to the table.

According to yet another aspect of the present invention, there is provided a method of calculating a service area, comprising: receiving notification information including identification information of a base station and positional information of the mobile communications terminal, the notification information being sent from the mobile communications terminal via a mobile communications network; storing a table indicating the identification information and the positional information included in the received notification information and corresponding to the identification information; examining a distribution of positions indicated by the positional information for each piece of identification information referring to the table; and calculating a service area of the base station indicated by the identification information based on the distribution.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

FIG. 7 is a diagram showing stored information of the base station information table 24a;

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
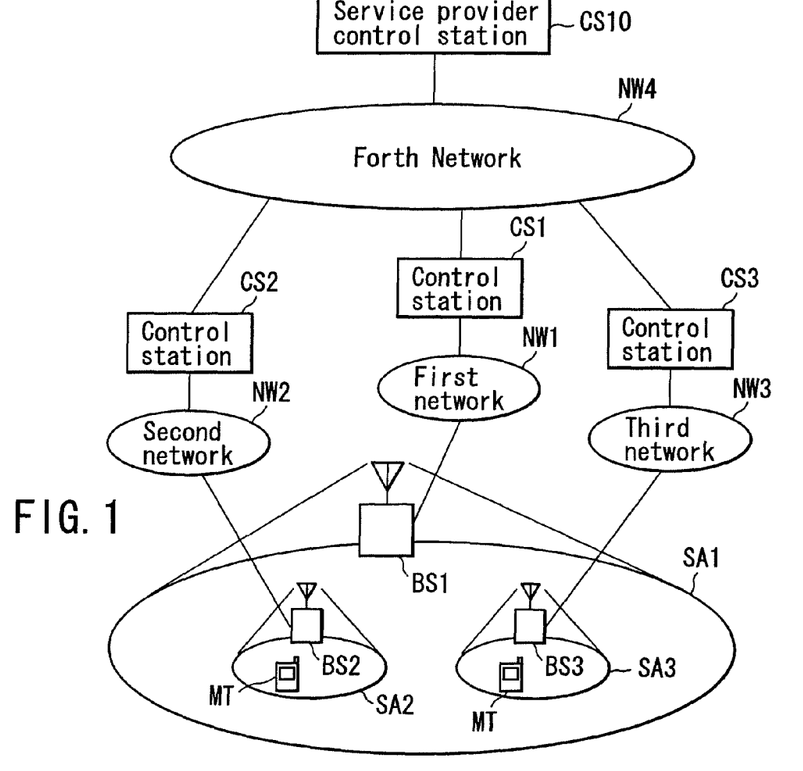
FIG. 1 is a block diagram showing a structure of a wireless communication system according to a embodiment of the present invention.

FIG. 1 is a block diagram showing a wireless communication system according to the present embodiment.

First to third networks NW1, NW2 and NW3 are mobile communications networks respectively provided by different providers. Base stations BS1 to BS3 are connected to the first to third networks NW1 to NW3. The base stations BS1 to BS3 respectively form service areas SA1 to SA3.

Furthermore, the base stations BS1 to BS3 perform a wireless communication with mobile communications terminals MT located within their service areas SA1 to SA3 so as to allow the mobile communications terminals MT to communicate via their networks. It should be noted that the service area SA1 is wider than the service areas SA2 and SA3. The service areas SA2 and SA3 exist within the extent of the service area SA1. The first to third networks NW1 to NW3 are connected to a fourth network NW4 via their control stations CS1 to CS3. A cellular system mobile communications network such as a mobile telephone network is assumed as the first network NW1, for example. Spot area services by a wireless LAN are assumed as the second and third networks NW2 and NW3, for example. The Internet is assumed as the fourth network NW4, for example. Generally, the first network NW1 provides a low transmission rate despite its wide service area and high mobility. The second and third networks NW2 and NW3 provide a high transmission rate despite their narrow service areas and low mobility.

It should be noted that the base station BS1 is connected to the first network NW1, but this is not shown in FIG. 1. Similarly, the base station BS2 is connected to the second network NW2, and the base station BS3 is connected to the third network NW3. These base stations BS1 to BS3 thus form the service areas SA1 to SA3, respectively.

The mobile communications terminals MT can optionally utilize the first to third networks NW1 to NW3 to communicate.

A service provider control station CS10 is connected to the fourth network NW4. A service area calculation apparatus according to the present invention is applied to the service provider control station CS10, which collects and distributes information on the service areas provided by the second and third networks NW2 and NW3.

Figure 2:
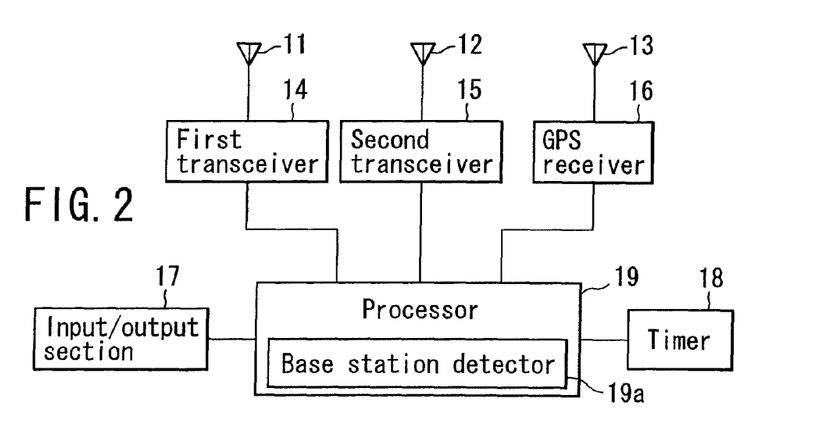
FIG. 2 is a block diagram showing a structure of a mobile communications terminal MT.

FIG. 2 is a block diagram of the mobile communications terminal MT.

As shown in FIG. 2, the mobile communications terminal MT includes antennas 11, 12 and 13, a first transceiver 14, a second transceiver 15, a global positioning system (hereinafter referred to as GPS) receiver 16, an input/output section 17, a timer 18 and a processor 19.

The first transceiver 14 performs a wireless communication with the base station BS1 via the antenna 11. The second transceiver 15 performs a wireless communication with the base stations BS2 and BS3 via the antenna 12. The GPS receiver 16 receives a GPS signal via the antenna 13. The GPS receiver 16 generates positional information indicating a current position of the mobile communications terminal MT based on the received GPS signal.

The input/output section 17 includes a display, a key button, a microphone or a speaker, and performs various kinds of input/output operations such as input of user operations and input/output of voices. The input/output section 17 may be individually provided with the various kinds of devices mentioned above or may be configured by integrating these devices in one unit.

The timer 18 generates date and time information indicating the current date and time.

The processor 19 is configured by use of a microprocessor, for example. The processor 19 performs various kinds of processing for generally managing the mobile communications terminals MT. The processor 19 comprises a base station detector 19a in addition to a function of performing known processing for achieving various functions that the mobile communications terminal MT comprises. The base station detector 19a utilizes the second transceiver 15 to obtain base station identification information on the base stations belonging to the networks other than the first network NW1.

This base station identification information is the information uniquely added to each base station.

The base station detector 19a generates notification information in which the positional information and the date and time information generated by the GPS receiver 16 and by the timer 18 at the point of obtaining the base station identification information correspond to the base station identification information.

The base station detector 19a sends the notification information to the service provider control station CS10 via the first network NW1. In other words, the base station detector 19a has a function of detecting the base station that belongs to the network other than the first network NW1 including the cellular system mobile communications network, and communicating information indicating a detected state of the base station to the service provider control station CS10.

Figure 3:
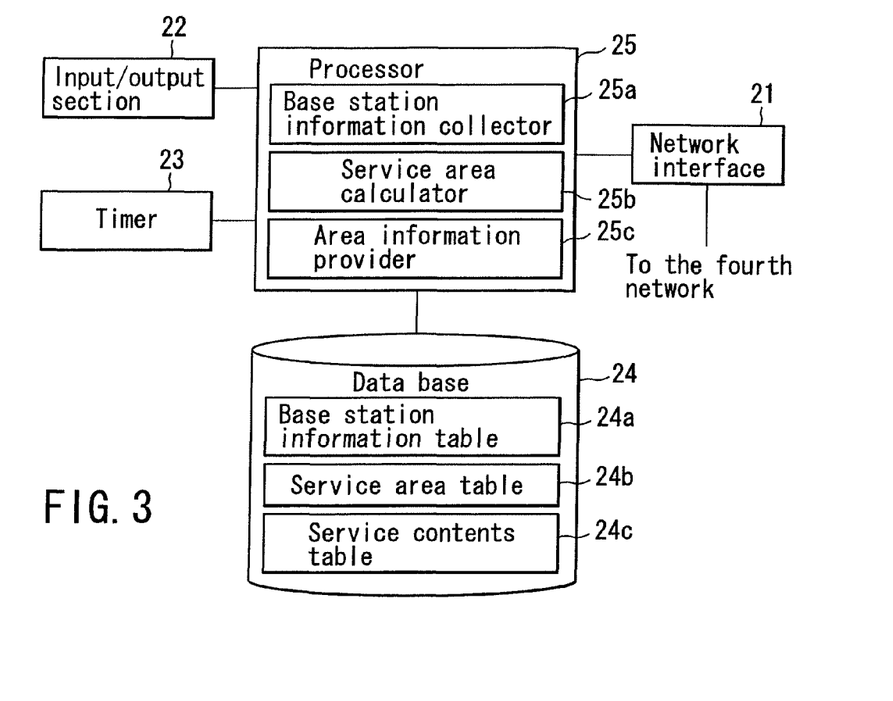
FIG. 3 is a block diagram showing a structure of a service provider control station CS10.

FIG. 3 is a block diagram showing a configuration of the service provider control station CS10.

As shown in FIG. 3, the service provider control station CS10 includes a network interface 21, an input/output section 22, a timer 23, a data base 24 and a processor 25.

The network interface 21 is connected to the fourth network NW4. The network interface 21 communicates via the fourth network NW4.

The input/output section 22 includes a display, a key button, a microphone or a speaker, and performs various kinds of input/output operations such as input of user operations and input/output of voices. The input/output section 22 may be individually provided with the various kinds of devices mentioned above or may be configured by integrating these devices in one unit.

The timer 23 generates date and time information indicating the current date and time.

The data base 24 stores various kinds of data for grasping the service areas provided by the second and third networks NW2 and NW3. In order to store such various kinds of data, a base station information table 24a, a service area table 24b and a service contents table 24c are set in the data base 24.

Here, the base station information table 24a stores the notification information sent from the mobile communications terminal MT. The service area table 24b stores service area information indicating the extent of the service areas. The service contents table 24c stores information indicating contents of the services provided by the base stations BS2 and BS3 belonging to the second and third networks NW2 and NW3.

The processor 25 is configured by use of a microprocessor, for example. The processor 25 performs various kinds of processing for generally managing the service provider control station CS10. The processor 25 comprises a base station information collector 25a, a service area calculator 25b and an area information provider 25c.

Here, the base station information collector 25a stores information, which is included in the notification information sent from the mobile communications terminal MT and received by the network interface 21, in the base station information table 24a. The service area calculator 25b calculates the service area of each base station by reference to the base station information table 24a. The area information provider 25c obtains, via the network interface 21, requirement information for provision of the information sent from the mobile communications terminal MT. The area information provider 25c generates area information on the above calculated service area considering the requirement information. The area information provider 25c also sends the area information to the mobile communications terminal MT which is a transmission source of the requirement information. In other words, the area information provider 25c provides the area information to the mobile communications terminal MT in accordance with the requirement from the mobile communications terminal MT.

Next, an operation in the present embodiment will be described.

First, the mobile communications terminal MT can basically receive services such as a voice communication, data transmission and software distribution if it can be connected to the control stations CS1, CS2 and CS3. It is assumed that the mobile communications terminal MT has completed at least procedures such as a contract with the first network NW1 in order to receive the services mentioned above.

Figure 4:
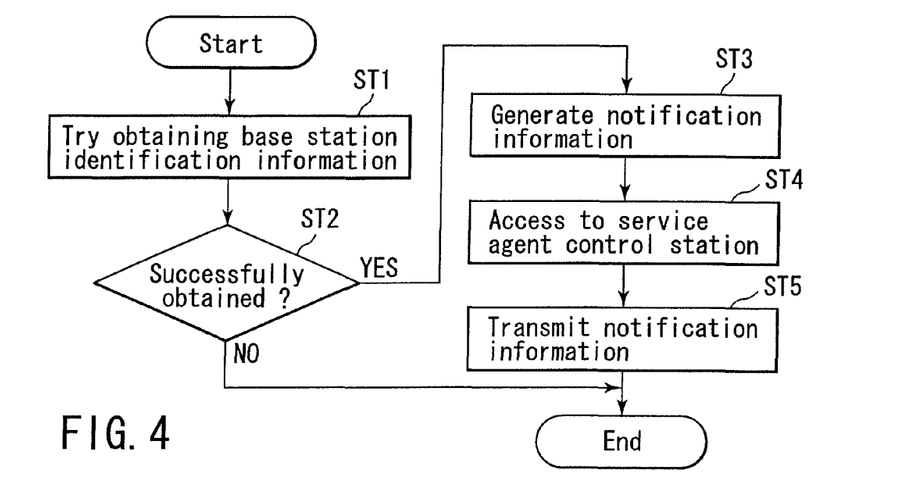
FIG. 4 is a flowchart showing a procedure of base station detection process in the mobile communications terminal MT.

The processor 19 of the mobile communications terminal MT executes base station detection processing shown in FIG. 4 as a function of the base station detector 19a at predetermined moments. The predetermined moments are moments at predetermined time intervals or moments when the mobile communications terminal MT moves for a certain distance, for example. In addition, the base station detection processing may be executed exclusively when the mobile communications terminal MT is not communicating.

In step ST1, the processor 19 uses the second transceiver 15 to try obtaining the base station identification information. Then, if the base station has supplied the base station identification information, the processor 19 obtains this supplied base station identification information via the second transceiver 15. Alternatively, the processor 19 tries communicating with the base station, and obtains via the second transceiver 15 the base station identification information communicated by the base station in a procedure for communication connection.

The base station available for communication might belong to a network with which the mobile communications terminal MT has not made a contract. In this case, the mobile communications terminal MT can not perform an actual communication, but the processor 19 can obtain the base station identification information since the base station communicates the base station identification information in a process prior to authenticating the mobile communications terminal MT in many cases. In addition, a MAC (media access control) address uniquely given to the base station is utilized as the base station identification information, for example. In addition to this, an IP (Internet protocol) address can also be utilized. A plurality of adjacent base stations could be covered since the IP address has its layer positioned higher than a MAC layer. This is effective in calculating the area as a base station group. In other words, when a plurality of base stations provides one service area, the IP address is used to enable detection per service area.

Subsequently, the processor 19 determines whether or not the base station identification information has been obtained successfully, in step ST2. If the base station identification information has been obtained successfully in this step ST2, the processor 19 generates the notification information in step ST3. The notification information generated by the processor 19 includes the base station identification information obtained in this step ST1, the positional information, and the date and time information generated by the GPS receiver 16 and by the timer 18 at the point of obtaining the base station identification information. In other words, the notification information is information indicating the base station identification information, the position where the base station identification information is obtained and the date and time when the base station identification information is obtained.

The processor 19 accesses the service provider control station CS10 via the first network NW1 in step ST4. The processor 19 then sends the notification information to the service provider control station CS10 via the first network NW1 in step ST5.

The processor 19 finishes the base station detection processing if it has completed the transmission of the notification information. If the processor 19 confirms that the base station identification information has not been obtained successfully in this step ST2, it finishes the base station detection processing without performing the step ST3 to step ST5.

Figure 5:
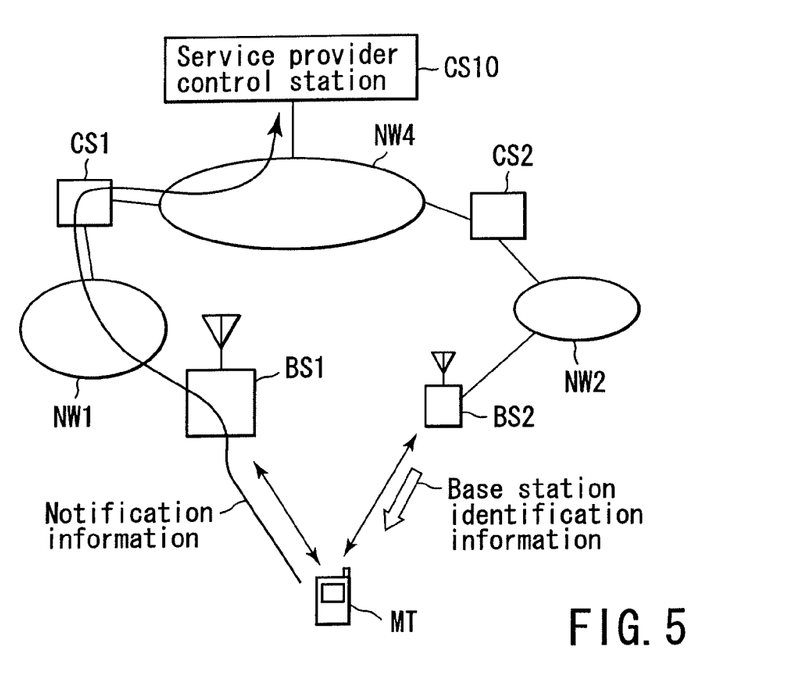
FIG. 5 is a block diagram showing how the mobile communications terminal MT obtains the base station identification information and sends the notification information including the base station identification information to the service provider control station CS10.

In this way, when the mobile communications terminal MT is in a state capable of communicating with the base station BS2, for example, the base station identification information sent from the base station BS2 is received by the mobile communications terminal MT as shown in FIG. 5 (showing how the mobile communications terminal MT obtains the base station identification information and sends the notification information including the base station identification information to the service provider control station CS10). The mobile communications terminal MT then sends the notification information including the received base station identification information to the service provider control station CS10 via the first network NW1 that is different from the second network to which the base station BS2 belongs. Therefore, the mobile communications terminal MT does not need to have a right to perform a communication via the second network NW2 to which the base station BS2 belongs.

Figure 6:
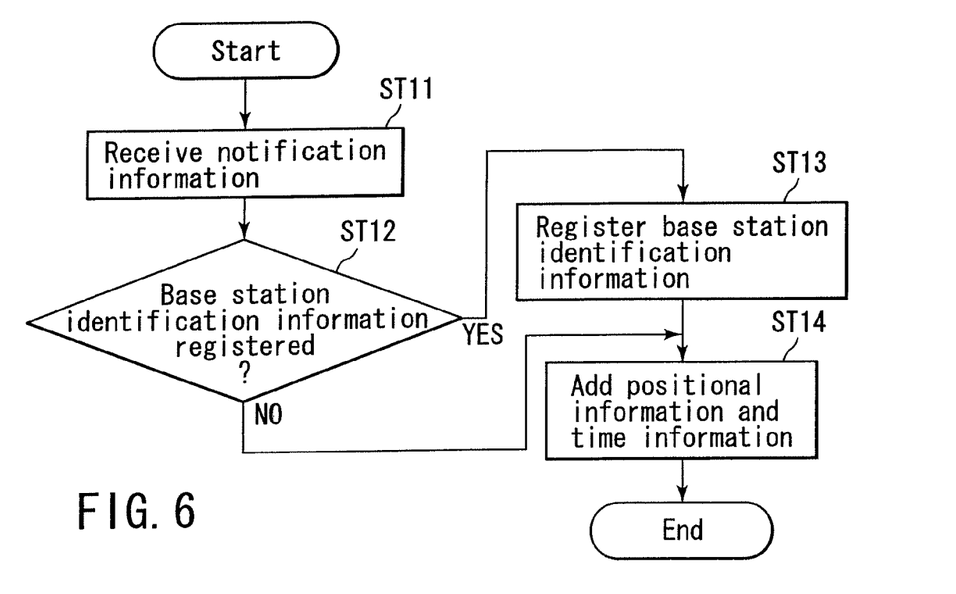
FIG. 6 is a flowchart showing a procedure of base station information storing process in the service provider control station CS10.

When the notification information is sent from the mobile communications terminal MT to the service provider control station CS10 as described above, the processor 25 of the service provider control station CS10 accordingly executes base station information storing processing as shown in FIG. 6.

Figure 7:
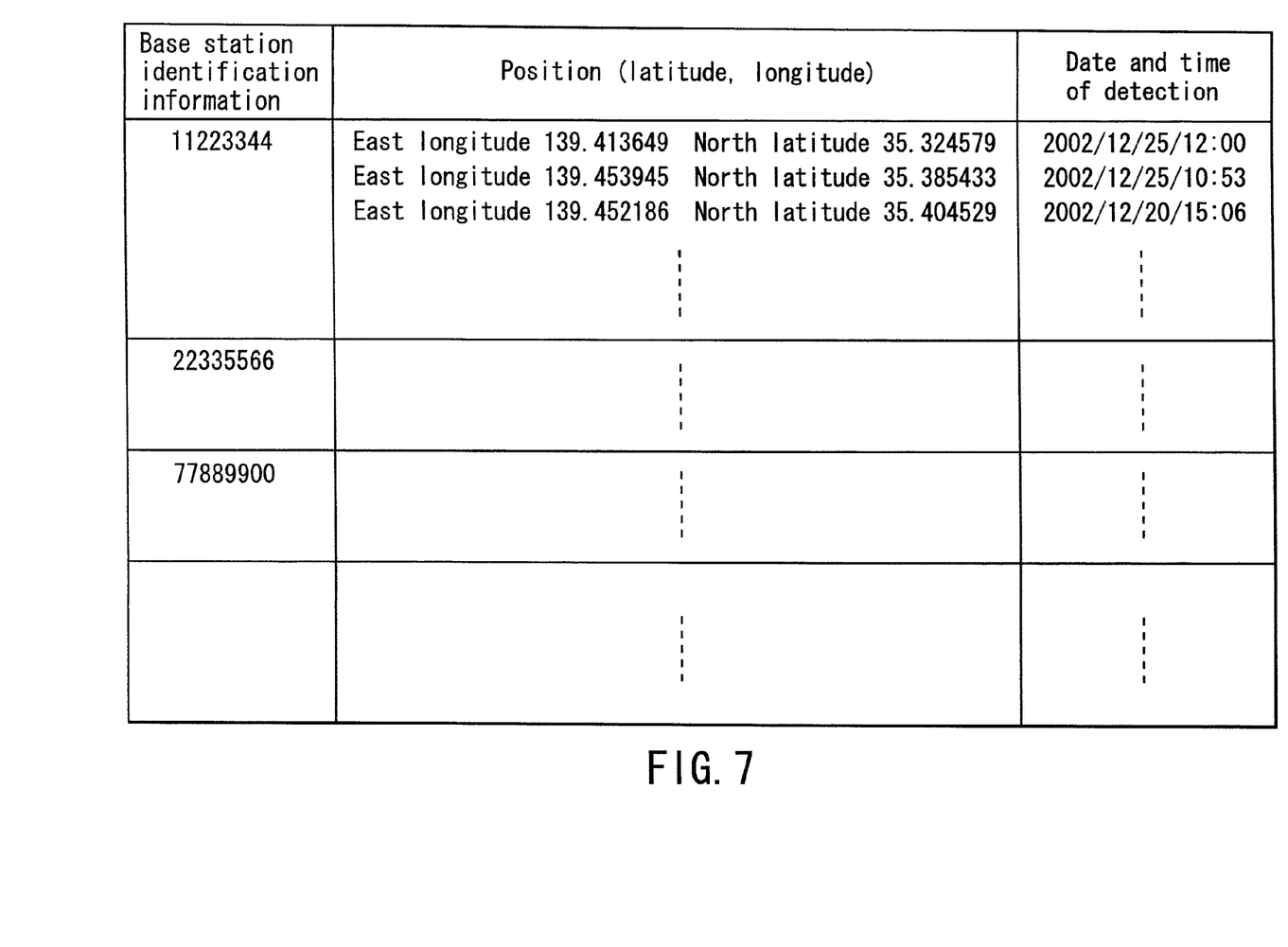

The processor 25 receives the notification information sent from the mobile communications terminal MT as described above via the network interface 21 in step ST11. In step ST12, the processor 25 determines whether or not the base station identification information included in the notification information has been registered on the base station information table 24a. The base station identification information, which is included in the notification information received in the past, is registered on the base station information table 24a as shown in FIG. 7 (a drawing which shows stored information of the base station information table 24a in FIG. 3), and correspondingly to this, the positional information and the date and time information are stored.

If the base station identification information included in the notification information that has been received this time has not yet been registered, the processor 25 registers this base station identification information on the base station information table 24a in step ST13. If the base station identification information included in the notification information that has been received this time has already been registered, the processor 25 passes over the processing of step ST13.

Subsequently, the processor 25 stores the positional information and the date and time information, which are included in the notification information received this time, in the base station information table 24a so that they correspond to the base station identification information, in step ST14. With this, the processor 25 finishes the base station information storing processing.

This base station information storing processing is executed every time the notification information is sent from the mobile communications terminal MT. As a result, the base station identification information and the information on the position where, and the date and time when the base station identification information is obtained are stored in the base station information table 24a.

Figure 8:
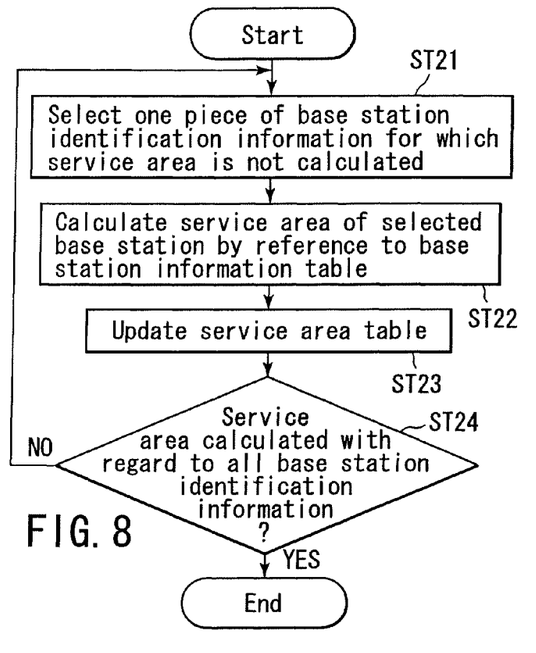
FIG. 8 is a flowchart showing a procedure of service area calculation process.

Next, FIG. 8 will be used to describe service area calculation processing.

In the service provider control station CS10, the processor 25 executes the service area calculation processing shown in FIG. 8 as a function of the service area calculator 25b at every predetermined moments. The predetermined moments are moments at predetermined time intervals or moments when the above-described base station information storing processing is finished, for example.

In step ST21, the processor 25 selects one piece of base station identification information, for which the service area has not yet been calculated in this time of service area calculation processing, from the base station identification information registered on the base station information table 24a. In step ST22, the processor 25 calculates the service area of the base station having the selected base station identification information, by reference to the base station information table 24a. In other words, the processor 25 calculates the service area considering the positional information and the date and time information stored in the base station information table 24a so that they correspond to the selected base station identification information.

Figure 9:
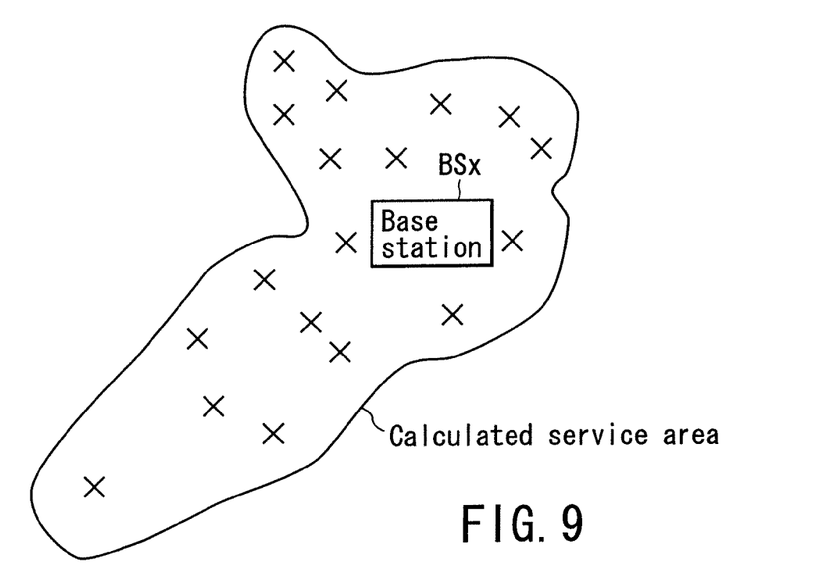
FIG. 9 is a view showing a specific example of service area calculation.

The service area is calculated based on positional distribution which is indicated by the positional information corresponding to the selected base station identification information. In FIG. 9 (showing a specific example of service area calculation), positions that are indicated by the positional information corresponding to the base station identification information possessed by a base station BSx are represented by "x". The service area is calculated as an area including all these positions. Various kinds of known methods can be conceived for an algorithm to decide an outer edge of the service area, but any algorithm may be adopted as long as those methods are used in a unified manner. This algorithm does not form essential portion of the present invention and will not be described in detail.

Furthermore, various kinds of methods can be conceived as a selection method of the positional information used to calculate the service area, but any method may be adopted also in this case as long as those methods are used in a unified manner.

For example, without considering the date and time information, the service area is conceivably calculated in consideration of the positions indicated by the positional information corresponding to one piece of base station identification information. In this case, the number of samples is increased, so that highly accurate calculation can be achieved.

Alternatively, the service area is conceivably calculated considering only the position indicated by the positional information to which the date and time information indicating the date and time within a predetermined period correspond, for example. By considering only the position indicated by the positional information to which the date and time information indicating the date and time within a certain most recent period correspond, it is possible to cope with a case where the service area is changed due to changes of buildings or vegetation on a periphery of the base station, and always possible to calculate the service area in line with current conditions.

Figure 10:
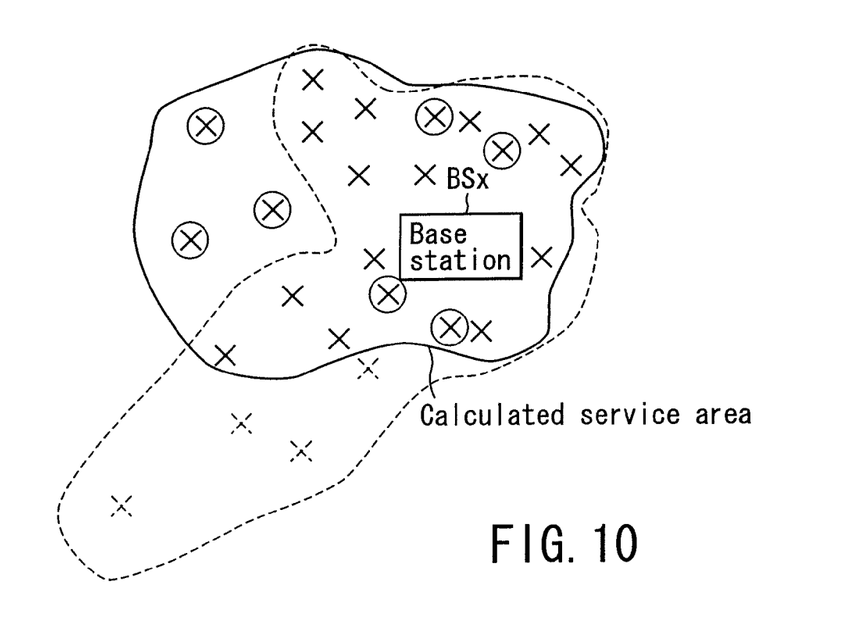
FIG. 10 is a view showing how the service area is recalculated.

FIG. 10 is a view showing how the service area is thus recalculated. In FIG. 10, symbols surrounding "x" with "O" are the positions indicated by the positional information which is newly collected after the service area shown in FIG. 9 has been calculated. Further, in FIG. 10, symbols "x" indicated by broken lines are the positions indicated by the older positional information which has been collected before the predetermined most recent period. By removing the older positions and calculating the service area considering the new positions, the service area different from that shown in FIG. 9 is calculated as shown in FIG. 10.

If the service area can be calculated as described above, the processor 25 updates the service area table so that information on the newly calculated service area is reflected, in step ST23. Subsequently, in step ST24, the processor 25 determines whether or not the base station identification information for which the service area has not yet been calculated is left on the base station information table, and the processor 25 repeatedly executes the processing of the step ST21 to step ST24 until the service area calculation is finished for all the base station identification information. The processor 25 thereby calculates the service areas for all the base station identification information registered on the base station information table 24a. If it can be confirmed in step ST24 that the service areas have been calculated for all the base station identification information, the processor 25 thus finishes the service area calculation processing.

Incidentally, the service provider control station CS10 utilizes, for example, a WWW (World Wide Web) technique to accept requests for information provision from the mobile communications terminal MT. If predetermined requirement information is sent from the mobile communications terminal MT and received by the network interface 21, the processor 25 executes area information providing processing shown in FIG. 11 as a function of the area information provider 25c.

Figure 11:
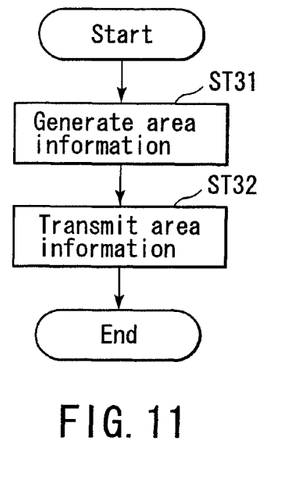
FIG. 11 is a flowchart showing a procedure of area information providing process.

In step ST31, the processor 25 generates the area information. The area information includes information indicating the extent of the service area of the base station to be selected, based on at least the information stored in the base station information table 24a. Specific contents of the area information may be optional, and several specific examples will be given below.

(1) Neighborhood Search

Figure 12:
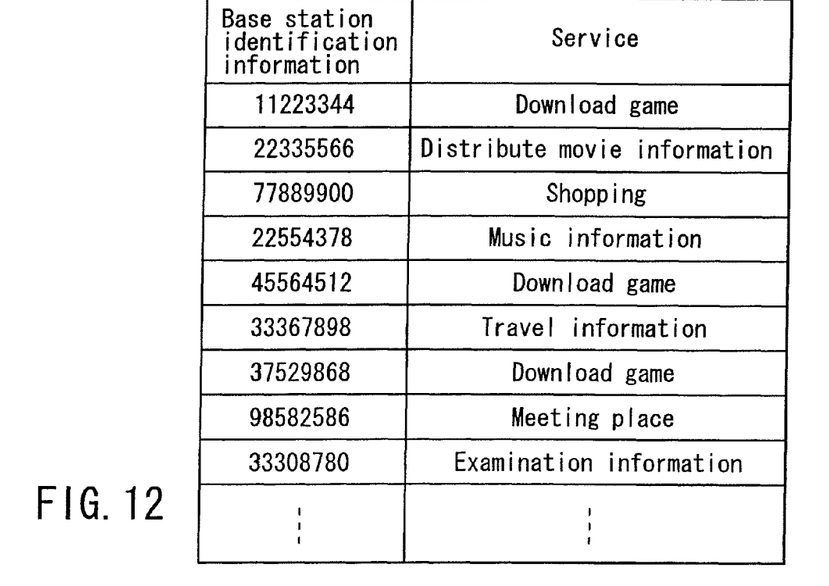
FIG. 12 is a view showing a stored information of the service contents table 24c.

When the received requirement information requires neighborhood search, the requirement information includes the positional information. The processor 25 extracts the information on the service area existing in the vicinity of the position indicated by the positional information from the service area table 24b. Then, the area information that includes information indicating the extent of the service area is created. At this moment, if contents of the service are written on the service contents table 24c with regard to the base station identification information corresponding to the extracted service area, information on the contents of the service may also be contained in the area information. It should be noted that the contents of the service provided by the base station have been written in advance on the service contents table 24c so that they correspond to the base station identification information as shown in FIG. 12 (a drawing showing the stored information of the service contents table 24c).

Therefore, the current position of the mobile communications terminal MT, which is the transmission source, can be recognized based on such area information. In addition, it is possible to recognize the extent of the service area existing in the vicinity of a position specified by the user. Further, with the information on the contents of the service, the contents of the service provided in each service area can be recognized.

(2) Service Search

If the received requirement information requires service search, the requirement information includes service kind information to specify the service. The processor 25 extracts the base station identification information corresponding to the service specified by the service kind information by reference to the service contents table 24c. The processor 25 then extracts information on the service area concerning the extracted base station identification information from the service area table 24b, and creates the area information including information indicating the extent of the service area thereof.

Therefore, in accordance with such area information, it is possible to know where the desired service can be provided.

If the area information is created as described above, the processor 25 next sends the area information to the mobile communications terminal MT, which is the transmission source, in step ST32. The processor 25 then finishes the area information providing processing.

The user of the mobile communications terminal MT is able to know various kinds of information on the service area in accordance with the area information as described above. Therefore, based on this information, the user can readily receive the services provided by the second network NW2 and the third network NW3.

Furthermore, the user of the mobile communications terminal MT is able to recognize the information on the service area provided by the second network NW2 and the third network NW3 before making contracts with them, so that it is possible to select a network useful to the user beforehand.

As described above, the service provider control station CS10 can calculate and grasp the service areas provided by the second network NW2 and the third network NW3 according to the present embodiment. Furthermore, according to the present embodiment, the service area information grasp by the service provider control station CS10 can be provided to the mobile communications terminal MT, so as to let the user of the mobile communications terminal MT know the service conditions in the second network NW2 and the third network NW3. In addition, the service provider control station CS10 can operate independently from both of the second network NW2 and the third network NW3, so that the above-mentioned services can be provided by a provider which is not concerned with the providers of the second network NW2 and the third network NW3.

In addition, it is effective for the providers of the networks in efficiently providing the service contents if the user of the mobile communications terminal MT utilizes each network after knowing the service conditions in each network.

Furthermore, according to the present embodiment, a wide wireless system such as the mobile telephone network is used for the first network NW1 which is used by the service provider control station CS10 to collect the base station information from the mobile communications terminal MT. The wireless system of this kind is generally highly reliable, so that the base station information can be reliably collected.

Still further, according to the present embodiment, the service area calculation processing is executed by the service provider control station CS10 after the base station information storing processing has been finished, thereby making it possible to always keep the information of the service area table 24b up-to-date.

In addition, the present invention is not limited to the embodiment described above. For example, the current position of the mobile communications terminal MT can also be detected based on receiving conditions of radio waves arriving from the base station. More specifically, a distance from each base station can be detected by measuring a reception level or the like of the radio waves from the base station, and the current position of the mobile communications terminal MT can be detected by comparing spaced distances with respect to a plurality of base stations. In this case, the positions of the respective base stations need to be known, but the positions can be detected with a simple configuration for only measuring the reception level.

Furthermore, it is possible to know a direction in which the radio waves are coming by providing the mobile communications terminal MT with a plurality of antennas and comparing the radio waves received by the respective antennas. As a simple method for this, a method is known which uses a phase difference of the radio waves. A super resolution method such as MUSIC (Multiple Signal Classification) by signal processing is known as a more accurate method. Further, the current position of the mobile communications terminal MT can be detected by recognizing the coming direction of the radio waves from a plurality of base stations (including satellites). In this case, a plurality of antennas and a circuit to compare the radio waves received by the antennas are necessary, but the positions of the base stations do not have to be known, thus allowing for high flexibility.

Still further, if the two methods mentioned above are combined to measure distances to the base stations and the directions of the base stations, the current position of the mobile communications terminal MT can be detected even when one base station transmits the radio waves to be received.

Further yet, the base station measures the current position of the mobile communications terminal MT, and the base station communicates the positional information to the mobile communications terminal MT. The mobile communications terminal MT can also detect its current position by receiving the positional information communicated by the base station. Also, the base station can directly notify the service provider control station CS10 of the current position of the mobile communications terminal MT measured by the base station as described above. However, in this case, a structure is provided to synchronize the notification of the position with the provision of the base station identification information from the mobile communications terminal MT to the service provider control station CS10. Further, as a method of detecting the current position of the mobile communications terminal MT by the base station, such a method is conceivable that measures a level of the radio waves emitted by the mobile communications terminal MT in the base station and computes a distance between the base station and the mobile communications terminal MT from the measurements. Moreover, it is also possible to conceive a method in which a plurality of antennas are provided in the base station for detection by the signal processing such as MUSIC mentioned above. In this way, the position of the mobile communications terminal MT is detected by the base station, so that the mobile communications terminal MT does not need to comprise a configuration for position detection, which is convenient to a size reduction of the mobile communications terminal MT, lower power consumption, lower costs and the like.

Further yet, the configuration of the network to be used in not limited to the embodiment described above. For example, any number of networks can be provided except for the first network NW1 and the fourth network NW4 that are different. The present invention can be utilized even in a situation where the service areas of the base stations overlap. In this case, it is assumed that the mobile communications terminal MT can simultaneously obtain the base station identification information owned by a plurality of base stations, but the notification information including the base station identification information of the plurality of base stations may be transmitted to the service provider control station CS10.

Further yet, as long as the service provider control station CS10 can obtain information on congestion and accounting states in each base station from each network, such information can also be contained in the area information. In this way, the user can select the service area which allows the smoothest communication and which can provide the services at the least cost.

Further yet, the service provider control station CS10 may calculate the service area without considering the date and time information at all. In this case, the mobile communications terminal MT does not need to include the date and time information in the notification information.

The area information may be provided not only to the mobile communications terminal MT but also to the mobile communications terminal without base station detection function. Alternatively, the area information may be provided to non-mobile terminals such as personal computers.

In addition to the above, various modifications can be implemented without departing from the spirit of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A mobile communication terminal configured to communicate with a service area calculation apparatus via a first mobile communication network, comprising:
   a positional information generator configured to generate positional information indicating a current position of the mobile communication terminal;
   a receiver which receives identification information sent from a base station of a second mobile communication network, the second mobile communication network being provided by a different provider from the first mobile communication network;
   a time information generator configured to generate time information indicating a current time
   a notification information generator configured to generate notification information including the identification information and the positional information generated at the time of receiving the identification information and the time information; and
   a transmitter which transmits the notification information to the service area calculation apparatus via the first mobile communication network.

2. The mobile communications terminal according to claim 1, wherein the position information generator generates the positional information based on a GPS (global positioning system) signal.

3. The mobile communications terminal according to claim 1, wherein the receiver receives a MAC (media access control) address as the identification information.

4. The mobile communications terminal according to claim 1, wherein the position information generator generates the positional information based on a reception state of each of signals transmitted from a plurality of different base stations.

5. The mobile communications terminal according to claim 1, wherein the position information generator generates the positional information based on a declination of signals received by a plurality of different antennas.

6. The mobile communications terminal according to claim 1, wherein the position information generator generates the positional information based on a position of the base station.

7. The mobile communications terminal according to claim 1, wherein the receiver receives an IP (internet protocol) address as the identification information.

8. The mobile communications terminal according to claim 1, wherein the receiver receives the identification information, when the second mobile communication network is a network with which the mobile communications terminal has not made a contract.

* * * * *